United States Patent
Riegler et al.

(10) Patent No.: US 7,409,887 B2
(45) Date of Patent: Aug. 12, 2008

(54) SHIFT DEVICE FOR A TRANSMISSION AND POWER DIVIDER OF A MOTOR VEHICLE HAVING SUCH A SHIFT DEVICE

(75) Inventors: Ernst Riegler, Graz (AT); Helmut Kassler, Voitsberg (AT)

(73) Assignee: Magna Powertrain AG & Co KG, Lannach (AT)

( * ) Notice: Subject to any disclaimer, the term of this patent is extended or adjusted under 35 U.S.C. 154(b) by 785 days.

(21) Appl. No.: 10/499,265

(22) PCT Filed: Dec. 18, 2002

(86) PCT No.: PCT/AT02/00355

§ 371 (c)(1),
(2), (4) Date: Dec. 16, 2004

(87) PCT Pub. No.: WO03/054426

PCT Pub. Date: Jul. 3, 2003

(65) Prior Publication Data

US 2005/0103143 A1    May 19, 2005

(30) Foreign Application Priority Data

Dec. 21, 2001    (AT) .............................. GM974/2001

(51) Int. Cl.
*B60K 20/00* (2006.01)

(52) U.S. Cl. .................. 74/473.37; 74/473.36; 74/335; 74/337.5

(58) Field of Classification Search .................. 74/335, 74/473.1, 473.12, 473.36, 473.37, 337.5
See application file for complete search history.

(56) References Cited

U.S. PATENT DOCUMENTS

| | | | | |
|---|---|---|---|---|
| 4,527,442 A | * | 7/1985 | Hoffmann et al. | 74/411.5 |
| 4,709,793 A | * | 12/1987 | Sakakibara et al. | 192/219.4 |
| 4,967,616 A | * | 11/1990 | Minami et al. | 74/335 |
| 5,888,165 A | * | 3/1999 | Besler et al. | 475/204 |

* cited by examiner

*Primary Examiner*—David M Fenstermacher
(74) *Attorney, Agent, or Firm*—Harness, Dickey & Pierce, P.L.C.

(57) ABSTRACT

A shift device for a transmission, which comprises a sliding sleeve, a shift fork engaging in the sliding sleeve, and an actuator that can rotate on a shaft that is disposed at an angle to the transmission shaft. In order to provide a simple and reliable control that satisfies all functional requirements, a cam having two flanks and a flattened section on the maximum radius is disposed on the shaft. On the base of the shift fork, two interacting pushrods are disposed at a fixed distance so that one pushrod rests against the one flank and the other pushrod rests against the other flank and one pushrod rests against the flattened section in at least one extreme position.

8 Claims, 5 Drawing Sheets

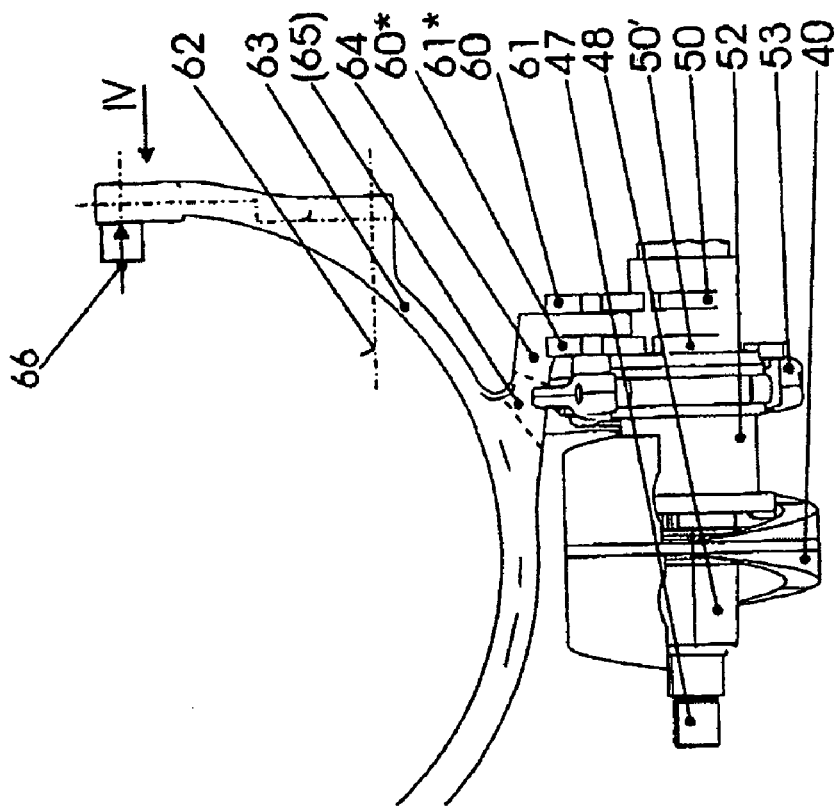
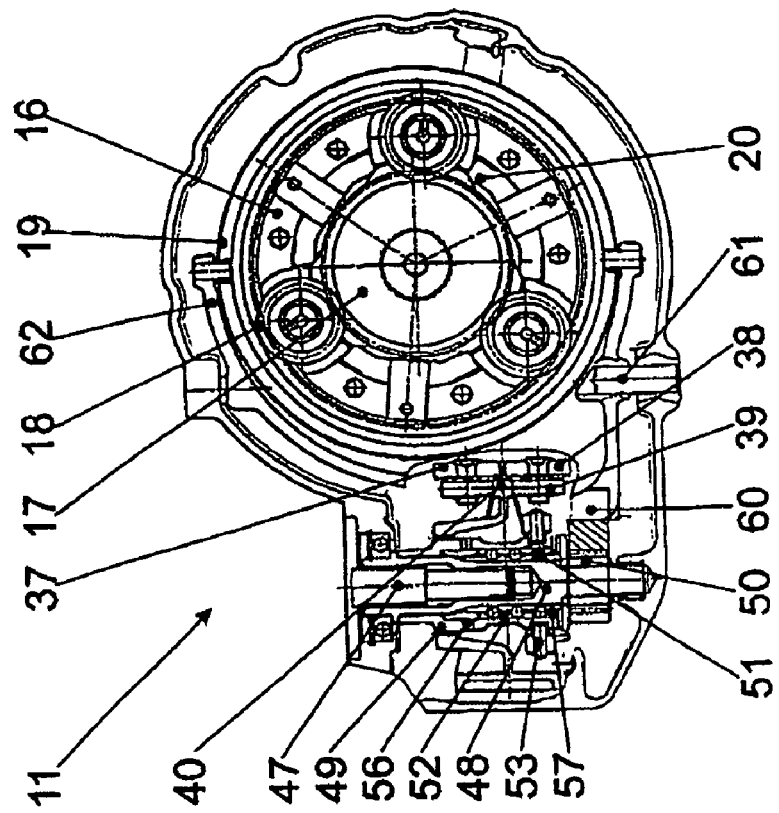
FIG. 2
FIG. 3

SHIFT DEVICE FOR A TRANSMISSION AND POWER DIVIDER OF A MOTOR VEHICLE HAVING SUCH A SHIFT DEVICE

BACKGROUND OF THE INVENTION

The invention relates to a shift device for a transmission, consisting of a shift sleeve, displaceable in the direction of the axis of a transmission shaft, for the driving connection of transmission members, of a shift fork engaging into the shift sleeve, and of, as actuator, an element which is rotatable on a shift shaft arranged transversely to the transmission shaft and which cooperates with a foot part of the shift fork.

It is known from WO 01/59331-A to adopt, as actuator a pinion which meshes with a corresponding toothing on the foot part of the shift fork, the shift shaft being driven by an electric gear motor.

This has some disadvantages: the step-up of this movement transmission is constant, which, as a rule, does not correspond to the profile desired for shifting and to the characteristic of the electric motor; especially not when the shift sleeve has synchronization. There are no stops, and the toothing has no blocking action, that is to say it cannot retain the shift sleeve in the respective position. Both factors, however, are particularly important in the case of an electromotive drive. The motor is, of course, to remain currentless after a completed changeover and is even to be capable of being uncoupled in specific applications, even when changeover took place counter to the ever-acting force of a spring. Furthermore, to simplify the control, the motor is to be capable of being moved up against a stop, in order to manage without position or speed sensors.

In order to remedy this, the object of WO 01/59331-A is to provide a detent disk firmly connected to the rotating element and a detent member engaging into a detent recess. Said detent member holds the rotating element after the uncoupling of the electric motor and ensures that this is possible only after a defined end position is reached. However, this remedy is highly complicated and is also not entirely satisfactory in functional terms. Due to the moments acting on the element and consequently on the detent disk (which emanate, for example, from the synchronization or from chamfers of the teeth in order to secure the sleeve against a stop), friction arises which obstructs or completely prevents the changeover. This may also occur when the two elements to be coupled are in an unfavorable relative position. The other gear in each case then cannot be engaged, and the sleeve remains set in the neutral position, which may lead to hazardous driving situations and therefore should not happen. Moreover, due to the long tolerance chain, positioning is inaccurate.

The object of the invention, therefore, is to propose a simple and reliable control which satisfies all functional requirements, in particular safety requirements.

SUMMARY OF THE INVENTION

The foregoing object is according to the invention, by means of the following:

a) the rotatable element is a cam which has two flanks extending from a minimum to a maximum radius and a flattening at the maximum radius, b) two lantern wheels cooperating with the cam are provided at a fixed distance from one another on the foot of the shift fork, c) so that one lantern wheel bears against one flank and the other lantern wheels bears against the other flank and, in at least one end position, one lantern wheel bears against the flattening and the other lantern wheel bears exactly against the minimum radius.

The cooperation of the cam of one member with the two lantern wheels of the other member, the two members having defined poles (one may be infinitely remote), provides a desmodromic control. In this context, the flattening is formed. Thus, one lantern wheel, together with a flattening, brings about a detention of the shift fork in an end position, and the other lantern wheel at the smallest radius gives rise to a stop. As a result, two functions, which it has been possible to fulfill only by means of two different pairs of members according to the prior art, are combined in a single pair of members, this being such that shifts can take place even counter to considerable holding forces. The lantern wheel pressing onto the flattening of the cam under the force of the coupling spring does not, of course, exert any torque on the cam. Furthermore, by the configuration of the cam shape, the step-up can be adapted to the shift requirements (in contrast to a conventional lantern wheel toothing in which the step-up must of course be constant).

In a preferred embodiment, the shift fork is a two-armed lever pivotable about an axis fixed with respect to the housing and the lantern wheels are cylinders, the axes of which are parallel to the axis of the shift shaft. This affords an accurate kinematic guidance of the two members, along with low friction; the latter to an especially great extent when the lantern wheels are rotatable about their axes. Furthermore, the flanks of the cam are enveloping curves of the lantern wheels when there is a common rolling movement of cam and lantern wheels. In this case, the step-up ratio of the rolling movement can be determined by means of the configuration of one flank of the cam, that of the other flank then arising from this.

In an advantageous development with a shift shaft driven by an electric motor, a shoulder is provided at the point of minimum radius on at least one flank. The electric motor can consequently be controlled automatically without path or speed regulation.

In order to ensure reliable shifting, further measures may advantageously be taken: when the shift fork surrounds a shift sleeve with a large diameter, the foot part of the shift fork is appended at the lowest point of the latter, the shift force thereby being introduced symmetrically into the shift fork. When there is the risk that the shift sleeve cannot be engaged in the case of a tooth-on-tooth position, the shift fork contains an elastic element, so that the foot part can move back. When the tooth position is favorable, shifting then takes place somewhat later by means of the force of the elastic element.

The invention is also concerned, particularly with regard to the power divider for motor vehicles, with an off-road gear step which can be shifted due to the axial displacement of one of its elements by means of a shift fork as a result of rotation of a shift shaft arranged transversely to the axial direction. In the case of a power divider, the problems referred to initially arise in a particularly disturbing way. They are eliminated by the invention.

BRIEF DESCRIPTION OF THE DRAWINGS

The invention is described and explained below with reference to figures in which:

FIG. 2 illustrates a section according to CC in FIG. 1, FIG. 3 illustrates a detail of FIG. 2, enlarged and varied.

DETAILED DESCRIPTION

Figure 1:
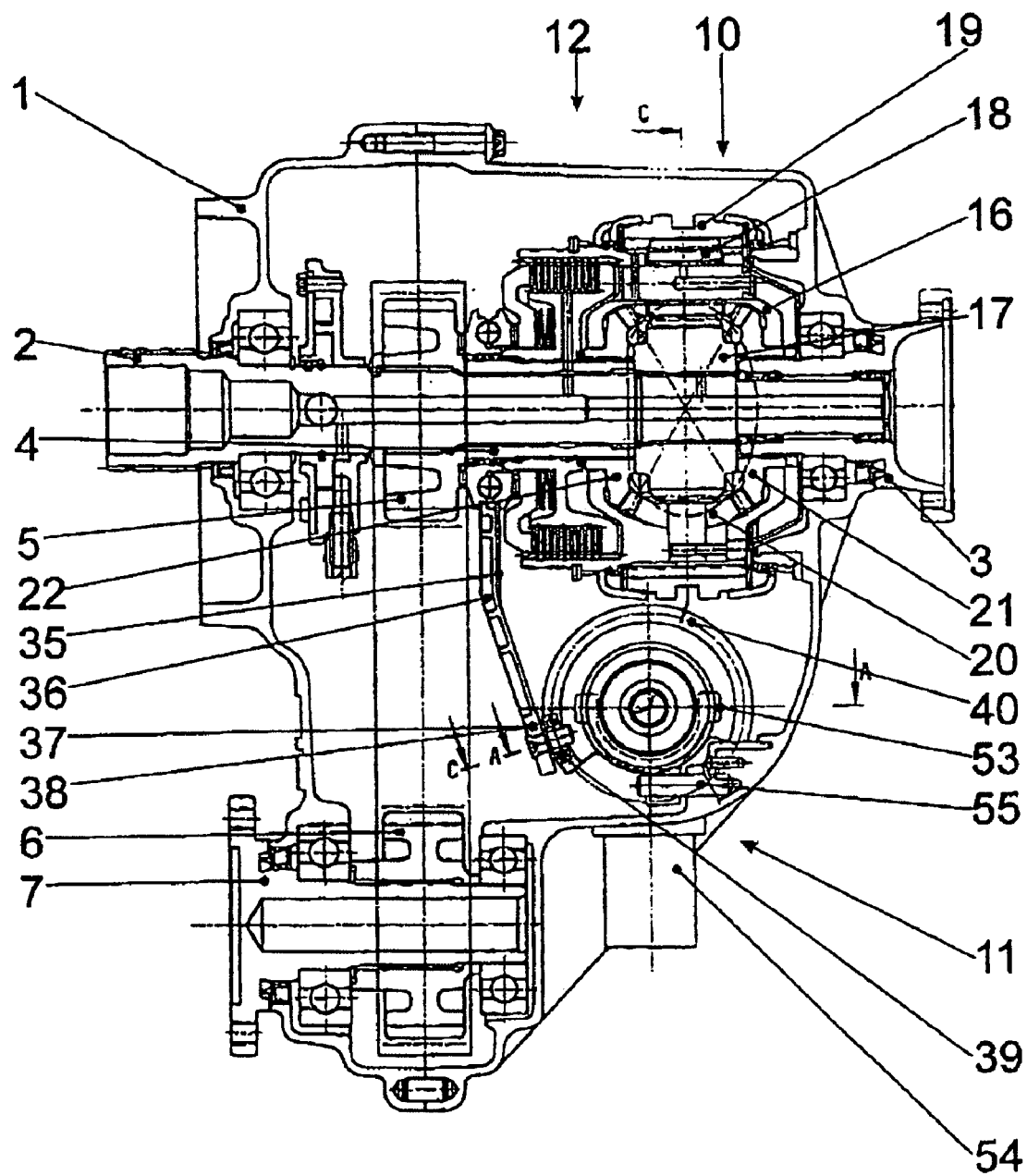
FIG. 1 illustrates a vertical section through a power divider having the shift device according to the invention.

In FIG. 1, the housing of a power divider is designated as a whole by 1, an input shaft coming from the drive unit, not illustrated, of the vehicle by 2, a first output shaft drive-connected to the rear axle by 3 and a second output shaft drive-connected to the front axle, likewise not illustrated, by 4. The second output shaft 4, by means of a first toothed-belt wheel 5, drives, below the input shaft 2, a second toothed-belt wheel 6 which is seated on a driven shaft 7 for the drive of the front axle.

To distribute the torque to the two output shafts 3, 4, a differential, designated in summary by 10, is provided. Furthermore, a control unit 11 below the differential 10 and a blocking clutch 12 for blocking the differential 10 are provided. In the exemplary embodiment shown, the blocking clutch is combined structurally with the differential 10. It could, however, also be arranged separately, indeed even anywhere else in the power divider or in the drive train. The differential itself may also have a widely differing design within the framework of the invention.

FIG. 1 and FIG. 2 show an exemplary and particular version of the power divider. Inside a differential housing 16, which serves here at the same time as a planet carrier, are located a sun wheel 17 connected fixedly in terms of rotation to the input shaft 2, planet wheels 18 of the off-road gear step, which are mounted rotatably in the differential housing 16, and first compensating wheels 21 and second compensating wheels 22. The former (21) are connected fixedly in terms of rotation to the first output shaft 3 and the latter (22) are connected fixedly in terms of rotation to the second output shaft 4. The differential housing 16 is surrounded by a ring wheel 19 which is axially displaceable and, in the off-road gear, is connected fixedly in terms of rotation to the differential housing 16. This special embodiment of the differential 10 is the subject of Austrian patent 405 157 and is described in more detail there in terms of type of construction and functioning.

The blocking clutch 12 is actuated by means of two ramp rings 31, 32 rotatable relative to one another. The first ring 31 possesses a first ramp lever 35, and the second ring 32 possesses a second ramp lever (36), said ramp levers projecting downward and possessing rollers 39 at their free ends 37, 38. Between the two rollers 39 is located a rotatable control disk 40. During the rotation of this control disk, the rollers 39 are moved apart from one another and, via the ramp levers 35, 36 moved in a scissor-like manner, the rings 31, 32 are rotated relative to one another.

In FIG. 2, 47 is a motor output shaft of an electric gear motor, not illustrated, said motor output shaft rotating with a corresponding step-down when the motor is running. Connected fixedly in terms of rotation to this motor output shaft is a carrier shaft 48 which is slipped onto the latter in a sleeve-like manner and which is mounted on both sides in the housing 1. The hub 49 of the control disk 40 and a cam 50 are mounted rotatably on the carrier shaft 48. Between the hub 49 and the cam 50, a changeover sleeve 52 is mounted fixedly in terms of rotation, but displaceably in the longitudinal direction, on the carrier shaft 48 by means of a longitudinal ball guide 51. The changeover sleeve 52 is displaced by means of a changeover fork 53 which is actuated by a changeover magnet 54 (FIG. 1) via a lever mounted in a changeover fork axis 55 (FIG. 1). The changeover sleeve 52, at its two axial ends, has first shift teeth 56 for rotationally fixed connection to the hub 49 and second shift teeth 57 for rotationally fixed connection to the cam 50. The shift teeth 56, 57 are coupling teeth with a deflecting pressure angle. If only one gear shift or only one blocking clutch is to be actuated, a changeover sleeve 52 is not necessary.

It can be seen in more detail in FIG. 3 that the cam 50 cooperates in a way still to be described with lantern wheels 60, 61 which are arranged on the foot part 64 of a shift fork 63 which is pivotable about an axis of oscillation 62 in the housing and by means of which the ring wheel 19 is displaced in the axial direction for changeover into the off-road gear. For this purpose, a sliding block 66 is provided on each of the two sides of the ring wheel. An elastically flexible intermediate zone 65 may be provided in the foot part 64.

In the exemplary embodiment shown, the cam 50 and the lantern wheels 60, 61 are duplicated (cams 50* and lantern wheels 60*, 61*) for reasons of lateral guidance, and the foot part 64 of the shift fork 63 is tied to the lowest point of the latter, hence in its axis of symmetry. By virtue of the latter aspect, the deformations of the two halves of the shift fork 62 are equal, so that they cannot become jammed.

Figure 4:
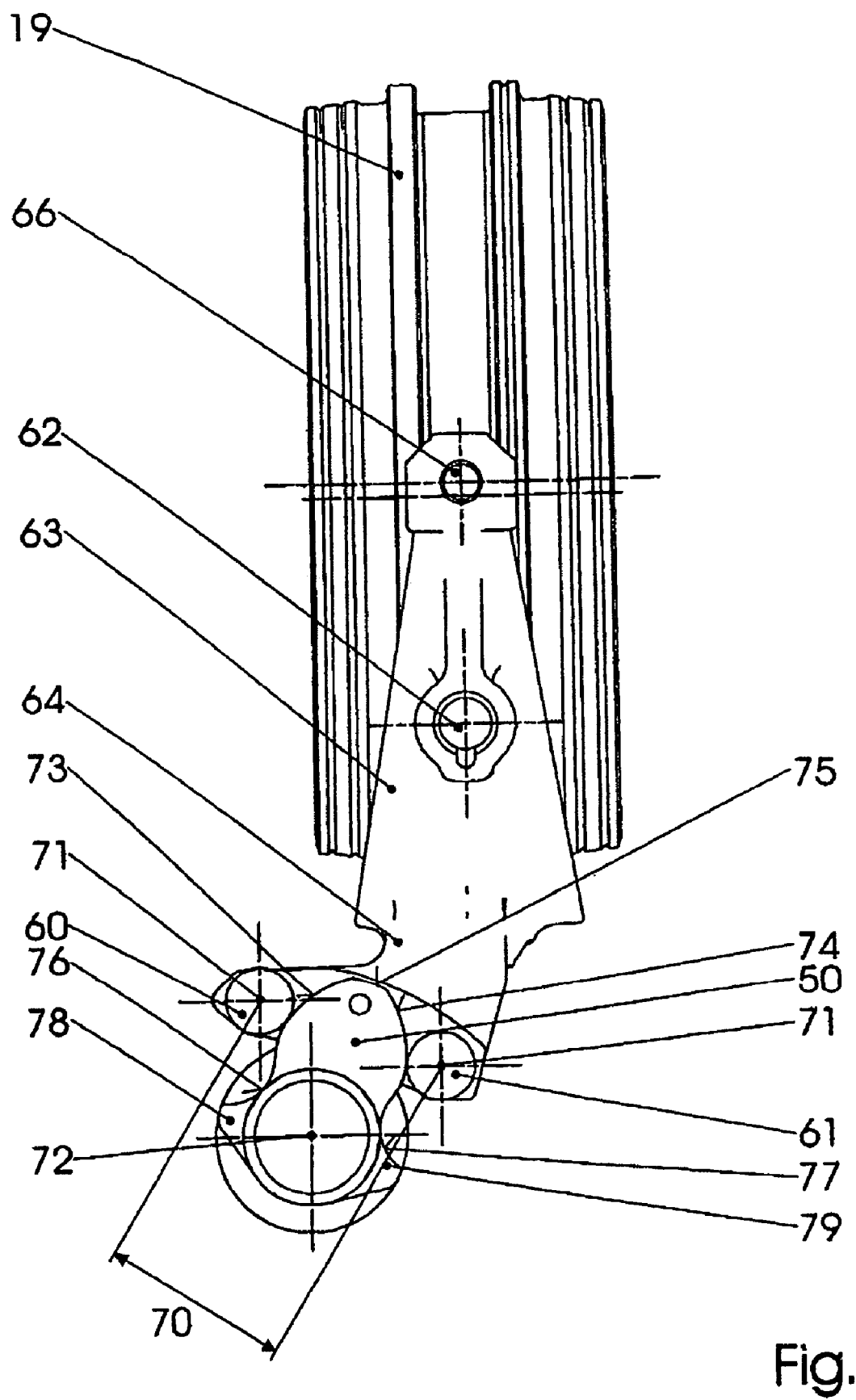
FIG. 4 illustrates a view according to IV in FIG. 3.

In FIG. 4, the kinematics of the cooperation of cam and lantern wheels 60, 61 can be seen. The lantern wheels 60, 61 are arranged at a fixed distance 70 from one another on the foot part 64 of the shift fork 63. Here, they are circular cylinders (other shapes may also be envisaged, see FIG. 7) with axes 71 which either are only geometric axes or are axes of rotation for the lantern wheels, on which they can rotate and thus roll on the cam 50, in order to minimize friction. The cam is rotatable with its shaft about an axis 72 and possesses a first flank 73, a second flank 74, at a maximum distance from the axis 72 a flattening 75, and at a minimum distance from the axis 72, that is to say at a minimum radius, valleys 76, 77 which shoulders 78, 79 adjoin. The flanks 73, 74 are shaped in such a way that in all the middle positions, such as, for example, in FIG. 4, the lantern wheel 60 always bears against the flank 73 and the lantern wheel 61 always bears against the flank 74. These flanks are therefore enveloping curves of the two lantern wheels. In contrast to a toothing, by means of a suitable shaping of the flanks 73, 74, different step-ups can be implemented as a function of angle. It can also be seen directly in FIG. 4 how, for example, a rotation of the cam 50 clockwise about its axis 72 causes a pivoting of the shift fork 63 counterclockwise about its axis of oscillation 62.

Figure 5:
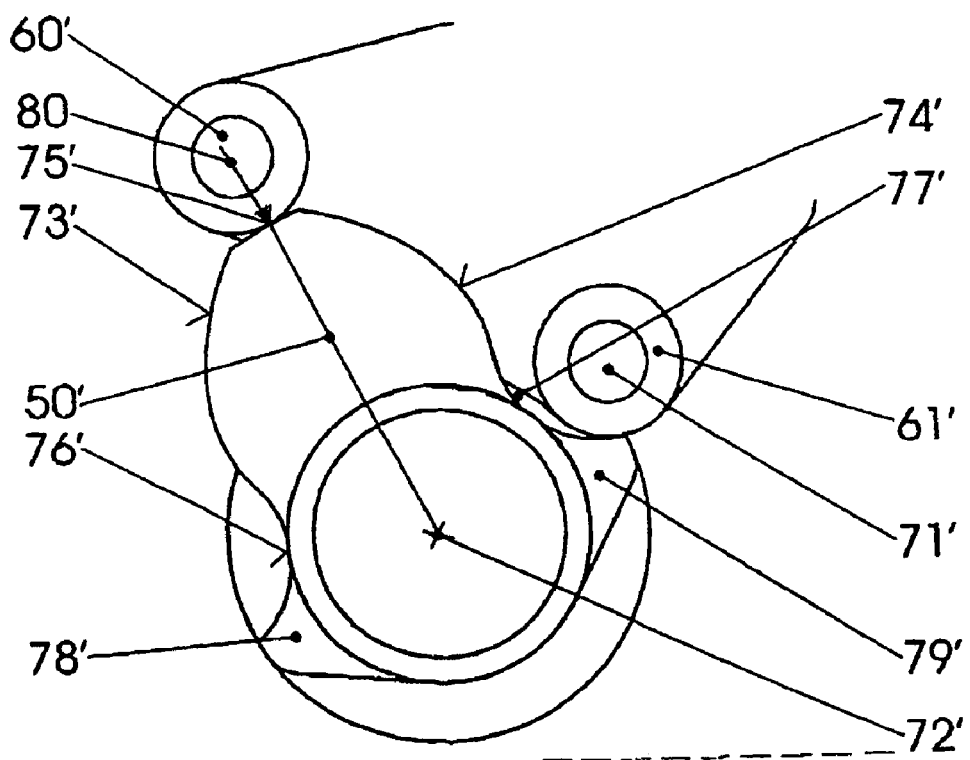
FIG. 5 illustrates the same as FIG. 4 in one end position.
Figure 6:
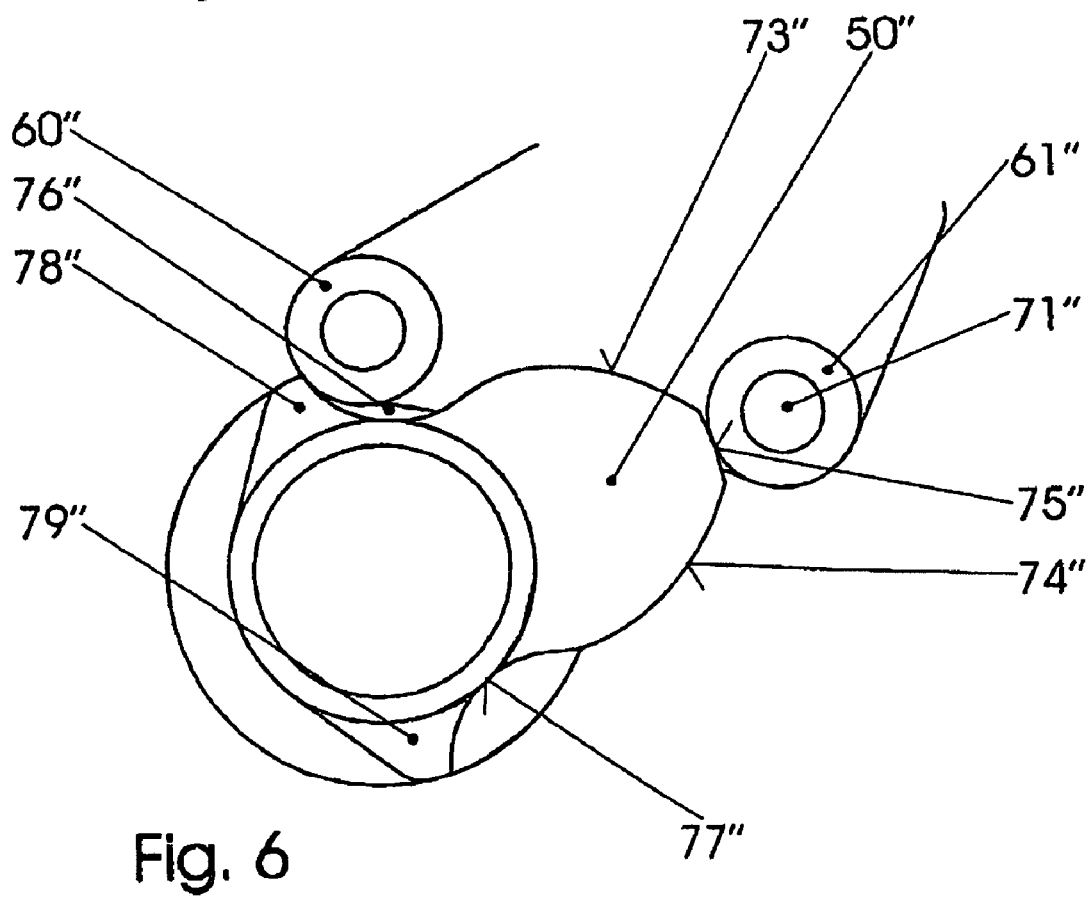
FIG. 6 illustrates the same as FIG. 4 in the other end position.

In FIG. 5, the cam 50' is in one end position. The lantern wheel 61' has run through the valley 77' and reached the stop 79'. As a result, the electric motor driving the cam has been stopped and reversed, so that, when switched on again, it rotates in the opposite direction. In this position, the other lantern wheel 60' is supported on the flattening 75'. Since the supporting force, illustrated by an arrow 80, is directed toward the axis 72' of the cam 50', no torque is in this case exerted on the cam 50'. The shift fork can thus be held in the position shown without action upon the motor and without locking. If appropriate, for safety purposes, a spring, not illustrated, is provided or a coupling spring, present in any case, acts as such. The other end position of FIG. 6 differs from that of FIG. 5 only in that the lantern wheels 60", 61" have exchanged their rollers, and in that the cam 50" is rotated clockwise approximately through a right angle. The shift fork is retained, here, in the other end position.

The possibility of providing an elastic zone 65 in the foot part 64 of the shift fork 63 was mentioned further above. When the ring wheel cannot be engaged in the case of a tooth-on-tooth position, the elastic zone allows the cam 50 to execute its adjusting movement as far as the end position, but without the fork itself being moved in this case. Only when the teeth of the ring wheel have been displaced somewhat with respect to its counterwheel is the ring wheel engaged by means of the force stored in the elastic zone.

Figure 7:
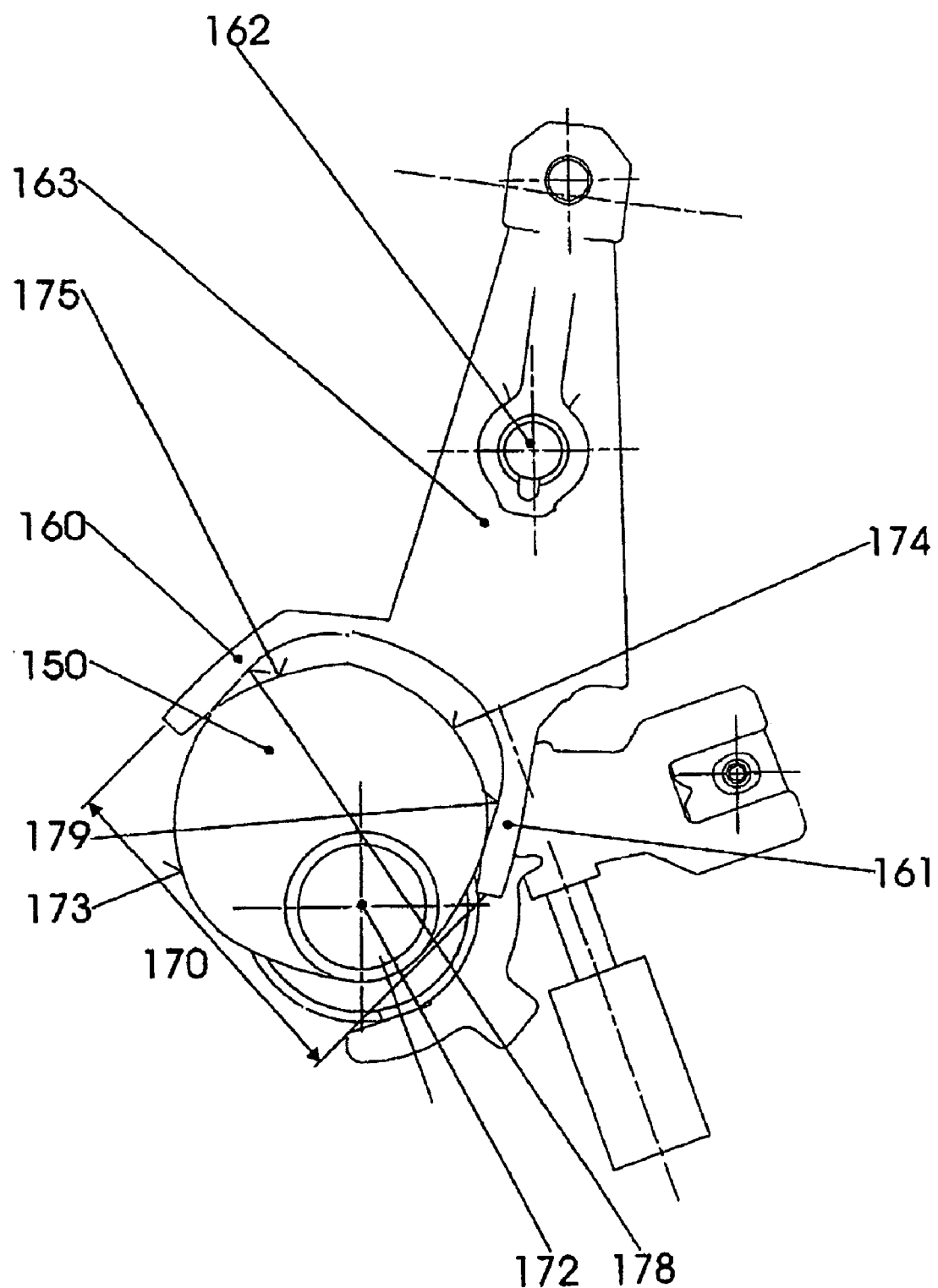
FIG. 7 illustrates another embodiment in a view similar to that of FIG. 4.

In the variant of FIG. 7, the cam 150 is to a very great extent widened and thickened. It cooperates kinematically with the lantern wheels 160, 161 which are not cylindrical here, but bar-shaped, and are provided with suitably shaped sliding surfaces 178, 179. Here, too, between the two members a desmodromic movement transmission prevails, in which the two contact surfaces 178, 179 are always in contact with the cam 150.

The invention claimed is:

1. A shift device for a transmission comprising:
a shift sleeve displaceable in a first direction for the driving connection of transmission members;
a shift fork for engaging said shift sleeve;
an actuator including:
a rotatable element rotatably supported on a shaft and arranged transversely to said first direction, said rotatable element cooperating with a foot part formed on said shift fork;
a cam defined by a flattening and a pair of flanks extending therefrom, said cam rotatable about a cam axis; and
a pair of lantern wheels cooperating with said cam at a fixed distance from one another on said foot part such that a first lantern wheel bears against a first flank and a second lantern wheel bears against a second flank;
wherein at least one of said first and second lantern wheels bears against said flattening when said cam is rotated to an end position.

2. The shift device of claim 1, wherein said first and second flanks join said flattening at a maximum distance from said cam axis and extend therefrom to a minimum distance from said cam axis.

3. The shift device as recited in claim 1, wherein said shift fork comprises a two-armed lever pivotable about a first axis and said pair of lantern wheels are circular cylinders having axes which are parallel to said first axis.

4. The shift device as recited in claim 3, wherein said pair of flanks envelope curves of said pair of lantern wheels during rotation of said cam and said lantern wheels.

5. The shift device as recited in claim 1, wherein said cam further defines a shoulder adjoining said first flank opposite said flattening and a second shoulder adjoining said second flank opposite said flattening.

6. The shift device as recited in claim 1, wherein said foot part is configured at an end of said shift fork opposite said shift sleeve.

7. The shift device as recited in claim 6, further comprising an elastic element supporting said foot part on said shift fork.

8. The shift device as recited in claim 1, further comprising a motor shaft coupled to said cam for driving rotation thereof.

* * * * *